US009632999B2

(12) United States Patent
Azzi et al.

(10) Patent No.: US 9,632,999 B2
(45) Date of Patent: Apr. 25, 2017

(54) TECHNIQUES FOR UNDERSTANDING THE ABOUTNESS OF TEXT BASED ON SEMANTIC ANALYSIS

(71) Applicant: KLANGOO, SAL., Hoboken, NJ (US)

(72) Inventors: Johnny Azzi, Kesrouan (LB); Romeo Issa, Union City, NJ (US); Walid Saba, Jersey City, NJ (US); Eddy Touma, Kesrouan (LB)

(73) Assignee: KLANGOO, SAL., Hoboken, NJ (US)

( * ) Notice: Subject to any disclaimer, the term of this patent is extended or adjusted under 35 U.S.C. 154(b) by 0 days.

(21) Appl. No.: 14/678,901

(22) Filed: Apr. 3, 2015

(65) Prior Publication Data

US 2016/0292145 A1    Oct. 6, 2016

(51) Int. Cl.
*G06F 17/27* (2006.01)

(52) U.S. Cl.
CPC ........ *G06F 17/271* (2013.01); *G06F 17/2785* (2013.01)

(58) Field of Classification Search
CPC .. G06F 17/271; G06F 17/277; G06F 17/2785; G06F 17/30684; G06F 17/30622; G06F 17/3066; G06F 17/30663; G06F 17/30666; G06F 17/30699; Y10S 707/99932; Y10S 707/99935; G06N 99/005
USPC .................... 704/9, 10; 706/14, 54; 345/467
See application file for complete search history.

(56) References Cited

U.S. PATENT DOCUMENTS

| 5,794,050 | A | | 8/1998 | Dahlgren et al. |
| 6,076,051 | A | * | 6/2000 | Messerly .......... G06F 17/30684 704/10 |
| 6,078,878 | A | * | 6/2000 | Dolan ................ G06F 17/2795 704/10 |
| 6,263,335 | B1 | | 7/2001 | Paik et al. |
| 6,453,315 | B1 | | 9/2002 | Weissman et al. |
| 6,675,159 | B1 | | 1/2004 | Lin et al. |

(Continued)

OTHER PUBLICATIONS

International Search Report Application No. PCT/US2016/025221, dated Jun. 20, 2016, 15 pages.

(Continued)

*Primary Examiner* — Charlotte M Baker
(74) *Attorney, Agent, or Firm* — Artegis Law Group, LLP (57) ABSTRACT

In one embodiment of the present invention, a semantic analyzer translates a text segment into a structured representation that conveys the meaning of the text segment. Notably, the semantic analyzer leverages a semantic network to perform word sense disambiguation operations that map text words included in the text segment into concepts—word senses with a single, specific meaning—that are interconnected with relevance ratings. A topic generator then creates topics on-the-fly that includes one or more mapped concepts that are related within the context of the text segment. In this fashion, the topic generator tailors the semantic network to the text segment. A topic analyzer processes this tailored semantic network, generating a relevance-ranked list of topics as a meaningful proxy for the text segment. Advantageously, operating at the level of concepts and topics reduces the misinterpretations attributable to key word and statistical analysis methods.

20 Claims, 5 Drawing Sheets

(56) References Cited

U.S. PATENT DOCUMENTS

| | | | |
|---|---|---|---|
| 6,778,970 B2* | 8/2004 | Au | G06F 17/2785 706/54 |
| 7,827,125 B1* | 11/2010 | Rennison | G06F 17/3066 706/14 |
| 8,370,128 B2* | 2/2013 | Brun | G06F 17/2705 704/10 |
| 2007/0106499 A1 | 5/2007 | Dahlgren et al. | |
| 2009/0055389 A1 | 2/2009 | Schilit et al. | |
| 2011/0179032 A1 | 7/2011 | Ceusters et al. | |
| 2013/0100139 A1* | 4/2013 | Schliesser | G06T 11/00 345/467 |
| 2014/0279773 A1 | 9/2014 | Chen et al. | |

OTHER PUBLICATIONS

Egozi et al., "Concept-based information retrieval using explicit semantic analysis." In: ACM 1-20 Transactions on Information Systems. Apr. 2011 (Apr. 2011) Retrieved from <http://gabrilovich.com/publications/papers/Egozi2011CBI.pdf> entire document.

* cited by examiner

TECHNIQUES FOR UNDERSTANDING THE ABOUTNESS OF TEXT BASED ON SEMANTIC ANALYSIS

BACKGROUND OF THE INVENTION

Field of the Invention

Embodiments of the present invention relate generally to computer science and, more specifically, to techniques for interpreting text based on what words and phrases mean in context.

Description of the Related Art

Natural language processing is essential for intelligent analysis of text. A wide variety of text mining applications (e.g., searching, document correlation, summarization, translation, etc.) rely on identifying meaningful patterns in text segments. In particular, targeting content to match user preferences often leverages pattern analysis of web page accesses and searches previously performed by the user.

In one approach to identifying patterns in text segments, key-word matching algorithms conflate words (sequences of characters) with meaning, ignoring the ambiguous and context-dependent nature of language. For example, the word "chair" has multiple word senses (i.e., meanings), including "a position of a professor in an academic institution" and "a seat for one person with a support for the back." Because key-word based algorithms do not differentiate between word senses, such approaches often misinterpret text segments and lead to irrelevant results. Consequently, a document comparison algorithm based on key-word matching might identify that a user manual for debugging a mouse (input device) and a description of trapping a mouse (rodent) are relatively similar.

In an effort to increase the reliability of text interpretation techniques, other approaches leverage statistical analysis algorithms to "guess" word senses. In one technique, applications select word senses based on the frequency distribution of the words in the text segment. While such an approach often produces more sensible results than a purely key-word based approach, statistical analysis is unreliable, particularly across genres and domains. For instance, the statistical word-meaning frequency of the word-meaning combination "resistance: opposition to the flow of electrical current" in electrical engineering textbooks is much higher than the statistical frequency of the word-meaning combination "resistance: the attempt to prevent something," that is prevalent in history texts. A more serious shortcoming of statistical techniques is that probabilities become less reliable and discriminate when you process and index hundreds of millions of pages across all domains.

As the foregoing illustrates, what is needed in the art are more effective techniques for interpreting text segments in computer-based implementations where word and phrase meanings are important.

SUMMARY OF THE INVENTION

One embodiment of the present invention sets forth a computer-implemented method for interpreting text segments based, primarily, on identifying word senses in context. The method includes parsing a text segment to generate one or more text-based words and related syntactic information; mapping each of the one or more text-based words to at least one concept based on a semantic network that includes concepts and one or more relevance ratings associated with the concepts, where each concept included in the semantic network is associated with a meaning and at least one word; generating a plurality of topics based on the mappings and the syntactic information, where each topic includes one or more of the concepts included in the semantic network; for each topic included in the plurality of topics, calculating a topic relevance rating between the topic and at least another topic included in the plurality of topics based on the relevance ratings between the concepts included in the topic and concepts included in the another topic; and ranking the plurality of topics based on the topic relevance ratings.

One advantage of the disclosed techniques for interpreting text segments is that operating at the granularity of concepts and topics enables a hierarchical, computer-based "understanding" of text segments based on word sense. By contrast, conventional interpretation techniques based on keyword matching lose contextual information during translation and may produce nonsensical (or highly irrelevant) results. In addition, by providing a structured meaning for text segments in a computer-consumable form, the disclosed techniques facilitate meaningful text interpretation in automated applications such as language translators, content recommendations, summarization, text classification, and search engines.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skills in the art that the present invention may be practiced without one or more of these specific details.

System Overview

Figure 1:
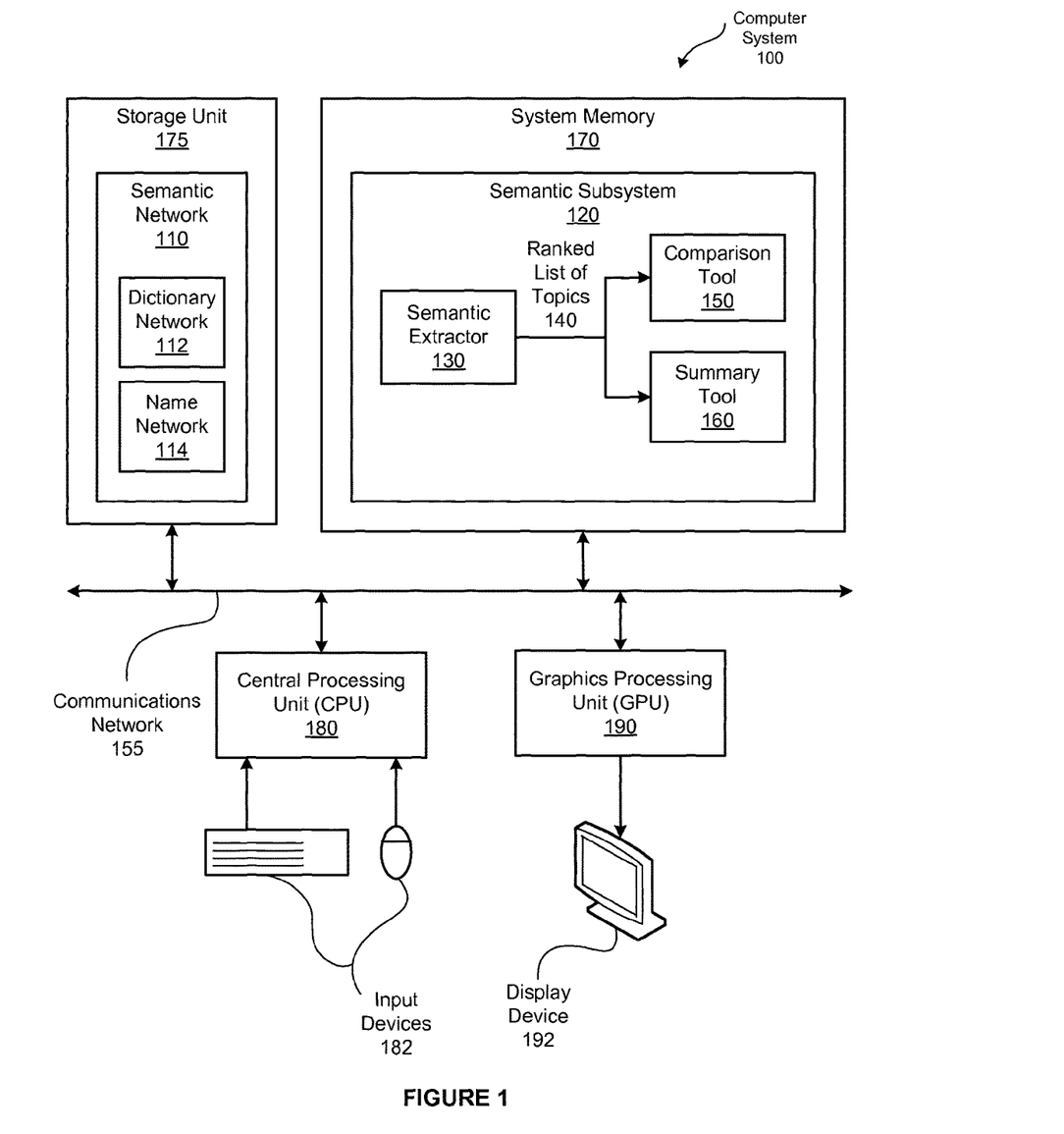
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 180, a system memory 170, a storage unit 175, a graphics processing unit (GPU) 190, input devices 182, and a display device 192. A communication network 155 interconnecting the various components in FIG. 1 may be implemented using any suitable bus or point-to-point communication protocol(s), and connections between different devices may use different protocols as is known in the art.

In some embodiments, the system 100 includes a cloud computing environment (i.e., encapsulated shared resources, software, data, etc.) that includes any number of the various components in FIG. 1 interconnected in any technically feasible fashion. Further, the cloud computing environment may be connected to any number of other components (including components in FIG. 1 that are outside the cloud computing environment) or any other cloud computing environment in any technically feasible fashion (e.g., the Internet). In general, the system 100 may be implemented within any number (including zero) of stand-alone units (e.g. a single computing unit), integrated units, distributed computing systems, client-server systems, and/or cloud computing environments in any combination.

The CPU 180 receives input user information from the input devices 182, such as a keyboard or a mouse. In operation, the CPU 180 is the master processor of the computer system 100, controlling and coordinating operations of other system components. In particular, the CPU 180 issues commands that control the operation of the GPU 190. The GPU 190 incorporates circuitry optimized for graphics and video processing, including, for example, video output circuitry. The GPU 190 delivers pixels to the display device 192 that may be any conventional cathode ray tube, liquid crystal display, light-emitting diode display, or the like. In various embodiments, GPU 190 may be integrated with one or more of other elements of FIG. 1 to form a single system. For example, the GPU 190 may be integrated with the CPU 180 and other connection circuitry on a single chip to form a system on chip (SoC). In other embodiments the GPU 190 is omitted from the system and the CPU 180 or other processing units perform graphics and video processing.

The system memory 170 and the storage unit 175 store content, such as software applications and data for use by the CPU 180 and the GPU 190. Typically, the system memory 170 stores the data and the software that is currently in use or has been used relatively recently by the CPU 180 and/or the GPU 190, whereas the storage unit 175 stores the data and the software that has been used less recently. Accordingly, the system memory 170 typically stores data in the form of Random Access Memory (RAM), while the storage unit 175 often includes read only memory (ROM), hard disks, tape, CD-ROM, distributed memory included in a cloud computing environment, etc.

Notably, the system memory 170 and the storage unit 175 includes applications that operate on text segments (i.e., text files, user input typed into a graphical user interface, search terms in a search engine, highlighted terms in a text editor, etc.). For instance, the computer system 100 may include applications that compare two documents for semantic similarities, a translator that converts English documents to French documents, etc. However, due to the context-dependent nature of natural languages and multiple meanings of each sequence of characters (i.e., words), interpreting the text segments in the intended manner is challenging.

For this reason, the system memory 170 includes a semantic subsystem 120 that is configured to efficiently and contextually interpret and process text segments in an accurate, automated fashion. In operation, to enable meaningful, computer-based "understanding" of text segments, the semantic subsystem 120 leverages a semantic network 110 that distinguishes between homographs (i.e., words that have the same spelling, but different meanings).

As shown, the semantic network 110 includes, without limitation, a dictionary network 112 (i.e., word-sense mappings) and a name network 114 (i.e., proper name-sense mappings). Unlike a dictionary that is organized based on the granularity of a word, the dictionary network 112 and the name network 114 are organized based on the granularity of a word sense (word-meaning combination), referred to herein as a "concept." Notably the dictionary network 112 includes word senses for words that are typically found in a dictionary, and the name network 114 includes word senses for common words and phrases that are not generally found in a dictionary. For example, the name network 114 may include proper nouns (names of things) that have at least one meaning, such as "Java" (the programming language). Notably, the name network 114 may include names that have multiple meanings (e.g., "Mustang," meaning a line of Ford cars, and "Mustang," meaning a little town in Oklahoma) Together the dictionary network 112 and the name network 114 provide a database of concepts represented by the semantic network 110. Notably, each concept included in the semantic network 110 is connected via semantic relationships (with varying relatedness scores) with other concepts in the semantic network 110.

Both the concepts and the semantic relationships between concepts enable a semantic extractor 130 included in the semantic subsystem 120 to perform meaningful semantic processing of text segments. For example, guided by links between concepts included in the semantic network 110, the semantic extractor 130 maps the term "chair" in the sentence "Nicole selected a chair with a high back" to the reasonable meaning "a seat for one person with a support for the back." By contrast, based on a dictionary that defines the word chair maps ambiguously, a conventional key-word based interpreter may map "chair" to the unrelated meaning "a position of a professor in an academic institution."

After performing this word sense disambiguation (computationally identifying the meaning of words based on context) process, the semantic extractor 130 provides additional insight into the meaning of text segments by syntactically generating on-the-fly "topics." Each topic includes one or more concepts and is described as a list of one or more (disambiguated) nouns or names, optionally preceded by one or more (disambiguated) adjectives. To create a topic for a particular text segment, the semantic extractor 130 maps the text segment to one or more relevant concepts, evaluates these relevant concepts based on the syntax of the text segment, and creates a grouping of one or more related relevant concepts.

For example, as part of processing a text segment included in a text book on programming languages, the semantic extractor 130 may create the topic "Java booklet" meaning a small book about a multi-platform object-oriented programming language. By contrast, as part of processing a text segment displayed on a vacation website, the semantic extractor 130 may generate the topic "Java booklet" meaning a brochure about an Indonesian island.

The semantic extractor 130 then orders the topics based on the relatedness scores of the topics (information that is included in the semantic network 110), thereby forming the ranked list of topics 140. The ranked list of topics 140 represents the meaning of the text segment (the "aboutness" of the text) in a computer-readable fashion that may be subsequently processed by any number of tools. In general, because the semantic extractor 130 bases translation on un-ambiguous concepts instead of ambiguous words, the semantic extractor 130 infuses "commonsense" knowledge into automated text analysis techniques. Advantageously, this computer-based, semantic understanding of text segments may be incorporated into a wide variety of tools to mimic human processes of comprehension with a reliability that eludes conventional (e.g., keyword or statistical) automated tools.

For example, as shown, the semantic subsystem 120 includes, without limitation, a comparison tool 150 and a summary tool 160. Upon receiving the ranked topic list 140, the summary tool 160 extracts a human-readable description of the ranked topic list 140. The summary tool 160 may be implemented in any technically feasible fashion. For instance, in some embodiments, the summary tool 160 displays the ranked topic list 140 without further processing. In other embodiments, the summary tool 160 synthesizes a textural summary based on one or more syntactic mapping operations between the text segment corresponding to the ranked topic list 140 and the ranked topic list 140.

Upon receiving at least two ranked topic lists 140 (corresponding to two or more text segments), the comparison tool 150 performs correlation operations on the ranked topic lists 140 to determine the relatedness of the text segments. In alternate embodiments, any number of tools may read the ranked topic list 140 and/or leverage the comparison tool 150 and the summary tool 160 to perform any number of text-based tasks, such as suggesting user-targeted websites, books, etc. based on the overall context and meaning of the text, instead of key words.

Semantic Network

Figure 2:
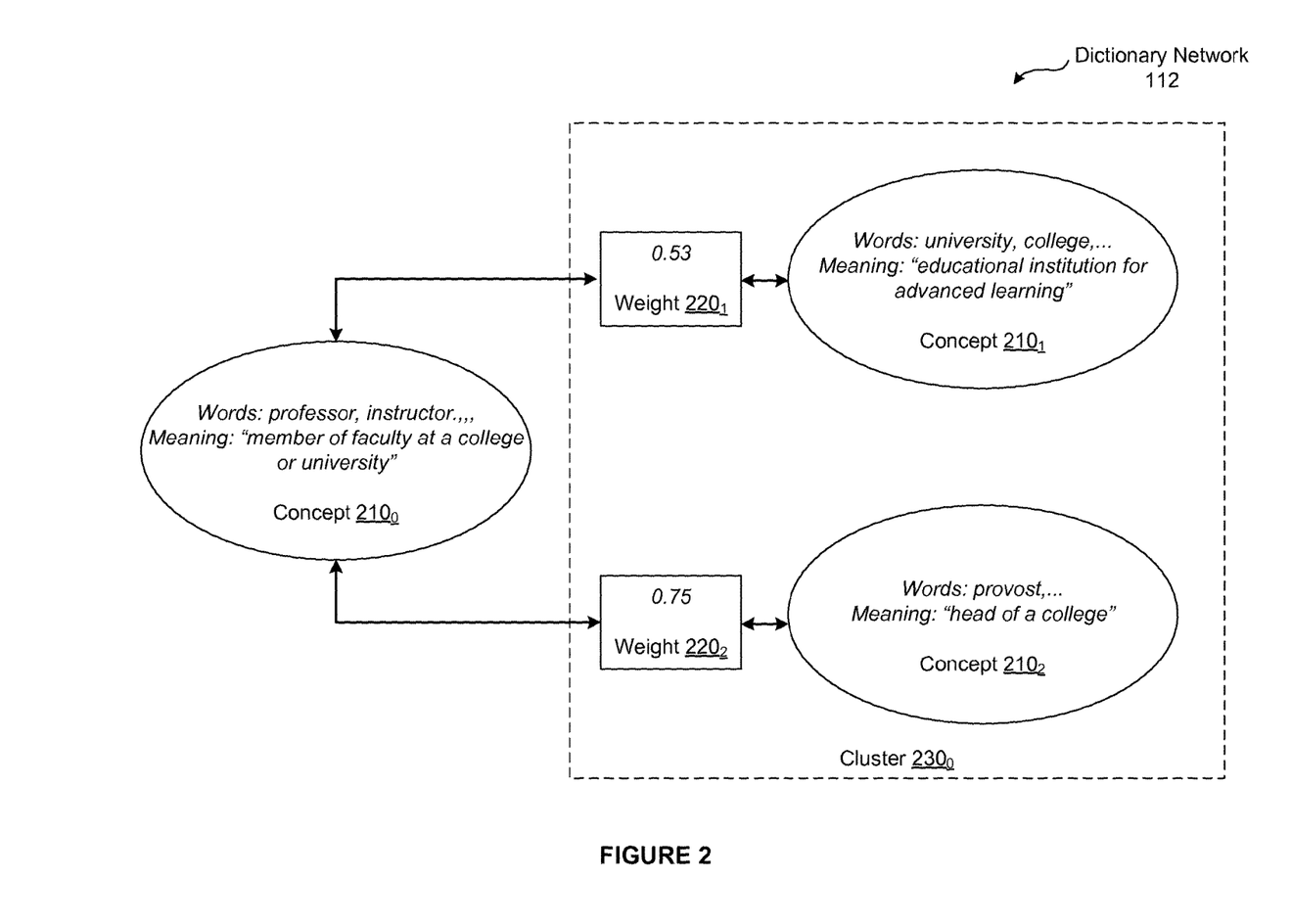
FIG. 2 is a conceptual diagram of the dictionary network of FIG. 1, according to one embodiment of the present invention.

FIG. 2 is a conceptual diagram of the dictionary network 112 of FIG. 1, according to one embodiment of the present invention. As shown in FIG. 1, the dictionary network 112 is included in the semantic network 110 of the computer system 100 and is stored in the storage unit 175. Although not shown in FIG. 2, the name network 114, also included in the semantic network 110, is structured similarly to the dictionary network 112. As persons skilled in the art will recognize, a word that is included in the dictionary network 112 may also be included in the name network 114. For example, the word "apple" may refer to a fruit or to the name of a software company.

As shown, the dictionary network 112 includes concepts 210 and clusters 230. Each concept 210 includes a set of words and a meaning that is paired with each of the words to provide a specific word sense, also referred to herein as a word-meaning combination. The set of words includes any number of synonyms for the meaning. For example, the concept $210_0$ includes the words "professor" and "instructor" as well as the meaning "member of faculty at a college or university." Consequently, the concept $210_0$ represents both the word-meaning combination "professor: member of faculty at a college or university" and the word-meaning combination "instructor: member of faculty at a college or university." In general, words and meanings have a many-to-many relationship.

The dictionary network 112 also includes the concept $210_1$ that represents the meaning "educational institution for advanced learning" and the concept $210_2$ that represents the meaning "head of a college." In alternate embodiments, the dictionary network 112 may include any number of the concepts 210 and each of the concepts 210 includes a meaning that may be expressed in any technically feasible fashion. Further, each of the concepts 210 includes any number of words, and each word may be included in any number of the concepts 210. Advantageously, the concepts 210 isolate language-specific words from meanings. For instance, in some embodiments, the dictionary network 112 may span multiple languages, and the concept $210_0$ may also include the French phrase "professeur."

In general, each of the concepts $210_i$ is associated with the cluster $210_i$ that represents an un-ordered set of the concepts 210 that are related to the concept $210_i$. For example, as shown, the concept $210_0$ (meaning "member of faculty at a college or university") is associated with the cluster $230_0$ that includes the related concept $210_1$ (meaning "educational institution for advanced learning") and the related concept $210_2$ "(meaning "head of a college"). Similarly, although not shown in FIG. 2, the concept $210_1$ is associated with the cluster $230_1$, and the concept $210_2$ is associated with the cluster $230_2$.

Because the concepts 210 may relate to each other with varying degrees, each member of the cluster 210 includes a weight 220 that reflects the relative strength of the connection. For example, concept $210_0$ (meaning "member of faculty at a college or university") is less closely related to the concept $210_1$ (meaning "educational institution for advanced learning") than to the concept $210_2$ (meaning "head of a college"). Consequently, the weight $220_1$ (0.53) of the semantic connection between the concept $210_0$ and the concept $210_1$ is less than the weight $220_2$ (0.75) of the semantic connection between the concept $210_0$ and the concept $210_2$.

The weights 220 included in the semantic network 110 may be assigned in any technically feasible fashion that tracks the semantic relatedness of the concepts 210. Further, the semantic subsystem 120 may evaluate, manipulate, and compare the aggregate weight of the clusters 230 in any technically fashion that is consistent with the definition of the weights 220. For example, in some embodiments, suppose that the cluster $230_n$ for the concept $210_n$ is the set of pairs:

cluster $230_n$={(concept $210_0$,weight $220_0$),(concept $210_4$,weight $220_4$), ... } where each (concept $210_i$, weight $220_i$) pair represents the degree to which the concept $210_i$ is related to the concept $210_n$, and the value of each of the weights 220 is between 0 and 1 inclusive. Concepts that are related with degree near zero are represented by a closed-world assumption (i.e., being absent from the cluster).

In such embodiments, the semantic extractor 130 is configured to compute the size of the cluster $230_n$ (denoted to by |cluster $230_n$|) as the sum of all the weights 220 of the concepts 210 in the cluster 230, which is a generalization of ordinary (non-weighted) set cardinality. More specifically:

|cluster $230_n$|=Σweight $220_i$, for every (concept $210_i$, weight $220_i$)∈ cluster $230_n$.

The semantic extractor 130 is further configured to implement the following similarity metric between the concept $210_n$ and concept $210_m$ (i.e., between the cluster $230_n$ that is related to concept $210_n$ and the cluster $230_m$ that is related to concept $210_m$).

0.5*(|cluster $230_n$∩cluster $230_m$|/|cluster $230_n$|+ |cluster $230_n$∩cluster $230_m$|/|cluster $230_m$|)

where |A∩B| denotes a fuzzy (or weighted) set intersection, and the semantic extractor 130 uses a combination of minimum and product as the triangular norm (t-norm) of the fuzzy set intersection.

The semantic network 110, including the dictionary network 112 and the name network 114 may be constructed in any technically feasible fashion. In some embodiments, the concepts 210 and the clusters 220 are initially based on any number of reference sources (e.g., thesauri, dictionaries, etc.) and any type of relationships (e.g., hypernyms, hyponyms, etc.). Subsequently, the concepts 210 and the clusters 220 are iteratively expanded using any technically feasible type of heuristic or learning algorithm. After the semantic network 110 is constructed, the semantic subsystem 120, including the semantic extractor 130, may exploit the information included in the semantic network 110 to meaningfully interpret any number of text segments.

Computer-Based Understanding of Text Segments Based on the Semantic Network

Figure 3:
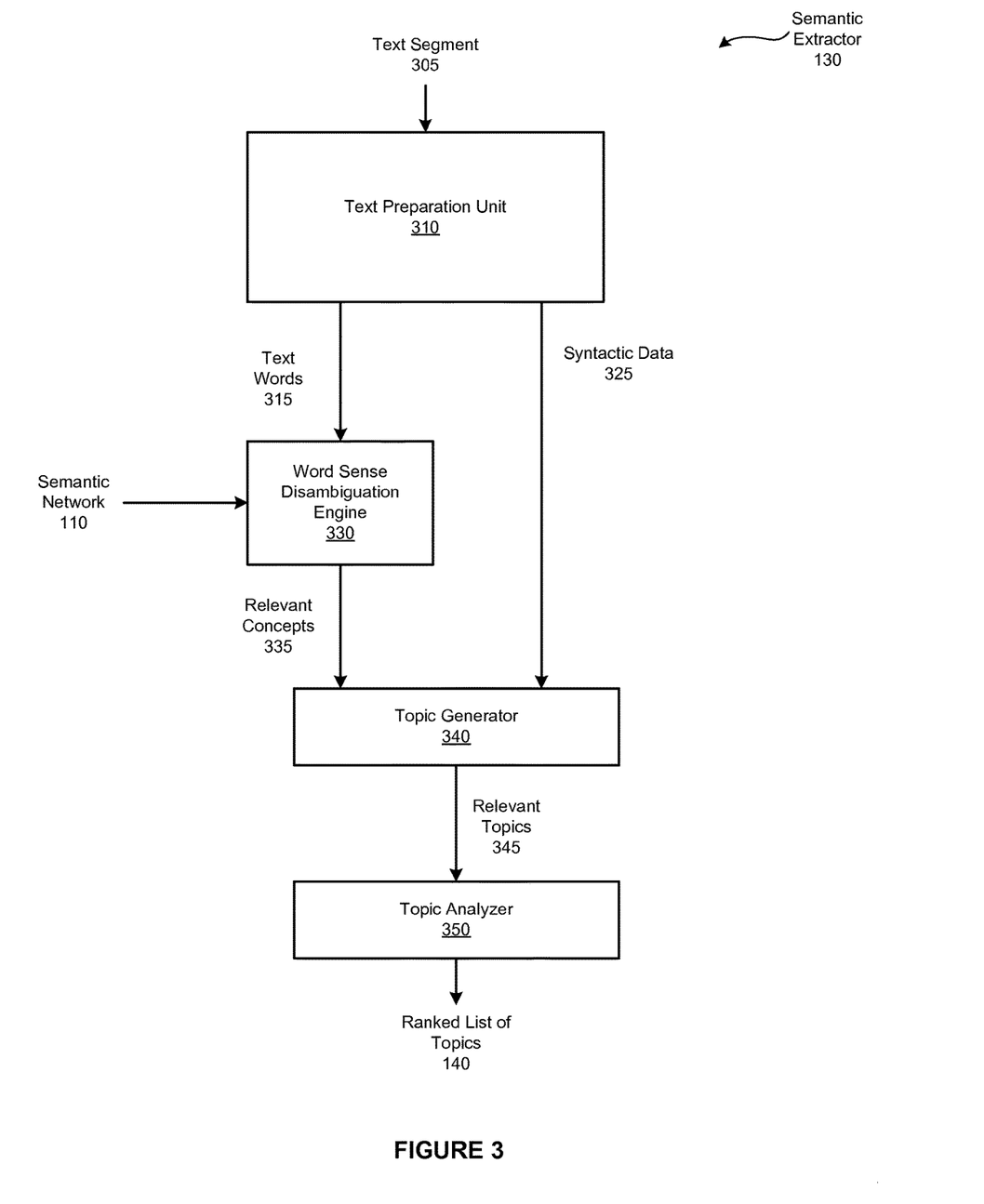
FIG. 3 is a conceptual illustration of the semantic extractor of FIG. 1, according to one embodiment of the present invention.

FIG. 3 is a conceptual illustration of the semantic extractor 130 of FIG. 1, according to one embodiment of the present invention. As shown, the semantic extractor 130 includes, without limitation, a text preparation unit 310, a word sense disambiguation engine 330, a topic generator 340, and a topic analyzer 350. As shown in FIG. 1, the semantic extractor 130 is included in the system memory 170 of the computer system 100 and executes on the CPU 180 and/or the GPU 190.

In general, the semantic extractor 130 leverages the semantic network 120 to efficiently translate a text segment 305 into the ranked list of topics 140. Notably, the ranked list of topics 140 is a structured semantic representation of the text segment 305 that includes contextual information extracted from the text segment 305 and, consequently, is a meaningful and reliable proxy for the text segment 305.

Upon receiving the text segment 305, the text preparation unit 310 parses the text segment 305 to obtain text words 315 that are included in the text segment 305 and syntactic data 325, such as positions of the text words 315 within the text segment 305 and syntactic category (noun, proper noun, adjective, etc.). The text preparation unit 310 may implement any parsing technique as known in the art and may output the syntactic data 325 in any technically feasible form.

The word sense disambiguation engine 330 then processes the text words 315 in conjunction with the semantic network 110—generating corresponding relevant concepts 335. The word sense disambiguation engine 330 may implement any technically feasible algorithm to map the text words 315 to the concepts 220 included in the semantic network 110. In general, the WSD engine 330 selects relevant concepts 210 to replace the text words 315 such that the weights 220 between the selected concepts 210 are maximized.

More specifically, in some embodiments, for each text word 315, the word sense disambiguation engine 330 calculates a number of scores for the most likely meaning of every word. In particular, the word sense disambiguation engine 330 calculates the geometric mean scores, word-to-word scores, and/or sense-to-sense scores and then computes a function that maximizes an overall, composite score. To calculate the geometric mean scores, the word-to-word scores, and/or the sense-to-sense scores, the word sense disambiguation engine (WSD) 330 may perform any number of evaluation operations on the text words 315 and the semantic network 110.

For example, in one embodiment, the word sense disambiguation (WSD) engine 330 implements the following algorithm to generate the geometric mean score for a selected text word 315. The WSD engine 330 selects one of the concepts 210 that includes the selected text word 315 and calculates relatedness scores of the selected concept 210 with the other text words 315. In particular the WSD engine 330 calculates the relatedness score of the selected concept 210 with a particular text word 315 as the maximum weight 230 between the selected concept 210 and all the concepts 210 that include the particular text word 315. Notably, for a text segment 305 that includes N words, the WSD engine 330 computes N relatedness scores for the selected concept 210. The WSD engine 330 then performs a geometric mean operation on these relatedness scores to calculate the geometric mean score for the selected concept 210. The WSD engine 330 repeats the geometric mean score calculation for each of the concepts 210 that includes the selected text word 315. Each concept 210 that includes the selected text word 315 is now associated with a single score—the geometric mean score of the relatedness scores.

To calculate the word-to-word score, the WSD engine 330 may implement any technically feasible algorithm based on the underlying assumption that for any two text words 315, the associated concepts 210 that are connected with the highest weight 220 are most likely the meanings intended for both words.

The sense-to-sense score represents the "helpfulness" of each of the concepts 210 with respect to mapping the text words 315. To calculate the sense-to-sense score, the WSD engine 330 matches each of the text words 315 against the other text words 315. For each pair of matching text word 315, one or more concepts 210 that are associated with one of the text words 315 in the pair may match well with many of the concepts 210 associated with the other text word 315 in the pair. Consequently, the WSD engine 330 increments a frequency of the "matching" concepts 210 (i.e., concepts 210 that are connected with a minimum predetermined value for the weight 230)—to indicate "helpfulness" regardless of the correct meaning for the text words 315.

For each of the concepts 210 for each of the text words 315, the WSD engine 330 then performs a weighted summation operation on the geometric score, the word-to-word score, and the sense-to-sense score to generate a composite score. Subsequently, the WSD engine 330 selects the concepts 210 with the maximum composite scores as the relevant concepts 335 that disambiguate the text words 315.

After the WSD engine 330 disambiguates the text words 315 into the relevant concepts 335, the topic generator 340 dynamically synthesizes relevant topics 345. More specifically, the topic generator 340 combines the relevant concepts 335 into sets of one or more ordered, composite concepts 210, referred to herein as the relevant topics 345, organized and structured based on the syntactic data 325.

Further, since the relevant topics 345 are fusions of the relevant concepts 335, the topic generator 340 properly infers the relatedness of each of the relevant topics 345 from the weights 220 between the concepts 210 included in the relevant topic 345. In this fashion, the topic generator 340 expands the semantic network 110 to include the relevant topics 345 and associated "run-time" clusters as first-class citizens in an expansion of the semantic network 110. Advantageously, this construction process customizes the semantic network 110 to reflect the text segment 305. An example of a topic synthesis algorithm implemented within the topic generator 340 is detailed in conjunction with FIG. 4 below.

Together, the relevant topics 345 indicate the content (or "aboutness") of the text segment 305. However, within the text segment 305, some of the relevant topics 345—the key topics—form a more lucid and meaningful representation of the text segment 305 than other relevant topics 345. For this reason, the topic analyzer 350 performs comparison operations on the relevant topics 345, creating the ranked list of topics 140.

For each of the relevant topics 345, the topic analyzer 350 determines the relatedness of the relevant topic 345 to the other relevant topics 345. In operation, the topic analyzer 350 selects and evaluates each of the relevant topics 345 based on the run-time clusters created by the topic generator 340 to identify a set of matching relevant topics 345. For each of the matching relevant topics 345, the topic analyzer 350 computes the run-time weight between the matching relevant topic 345 and the selected relevant topic 345. The topic generator 340 then calculates the overall relatedness score of the selected relevant topics 345 to the other relevant topics 345 as a function of these run-time weights.

In some embodiments, the topic analyzer 350 then adjusts the overall relatedness scores to reflect the spread of the relatedness scores across the text segment 305. In this fashion, the topic analyzer 350 captures that the relatedness of the relevant topics 345 within the text segment 305 correlates not only to the prevalence of the relevant topic 345 within the document but also to the spread of the relevant topic 345 across the text segment 305. Advantageously, such an adjustment computationally mimics "human common sense"—recognizing that the relevant topics 345 that are discussed at length in an isolated portion of the text segment 305 are likely to be less important than more relevant topics 345 that are less frequently, but more consistently discussed throughout the text segment 305. Notably, because the topics are meanings and concepts instead of textual phrases, this very contextual and pragmatic analysis is feasible and efficient.

In various embodiments, the topic analyzer 350 performs additional optimizing tasks as part of creating the ranked list of topics 140 based on the relatedness scores. In some embodiments, the topic analyzer 350 prunes the relevant topics 345 that correspond to domain or subject neutral topics that typically score highly in any text segment, irrespective of the subject matter. In other embodiments, the topic analyzer 350 removes the lowest-scoring of the relevant topics 345 from the ranked list of topics 140. Alternatively, the topic analyzer 350 identifies and removes the relevant topics 345 with relatedness scores below a predetermined threshold.

Figure 4:
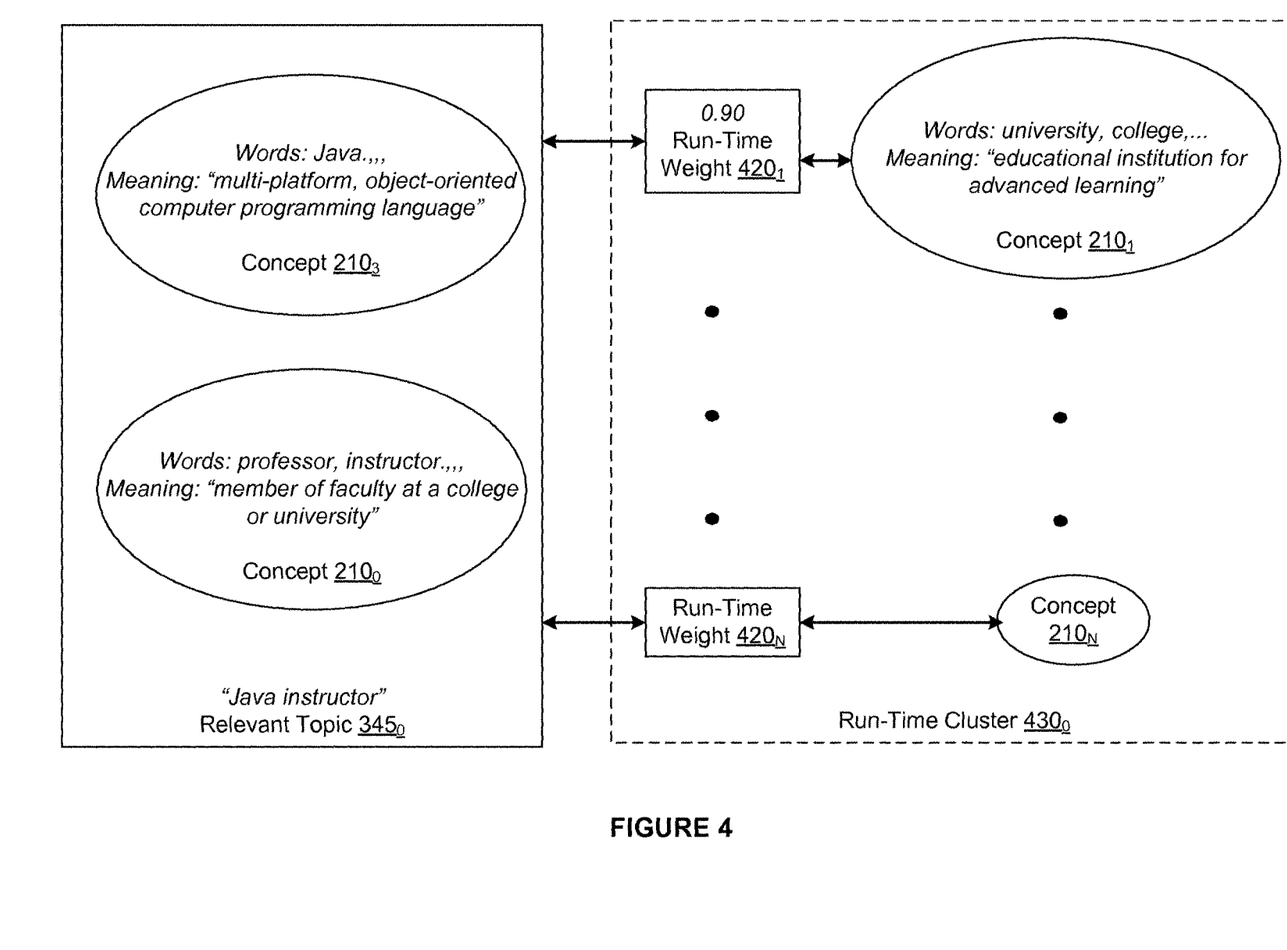
FIG. 4 is a conceptual illustration of a relevant topic generated at run-time by the topic generator of FIG. 3, according to one embodiment of the present invention.

FIG. 4 is a conceptual illustration of the relevant topic $345_0$ generated at run-time by the topic generator 340 of FIG. 3, according to one embodiment of the present invention. For explanatory purposes only, it is assumed that the topic generator 340 synthesizes and adds the relevant topic $345_0$ to the semantic network 110, which includes the dictionary network 112 detailed in FIG. 2, based on the syntactic data 325 and the relevant concepts 335 associated with the text segment 305.

As shown, the topic generator 340 composites the relevant topic $345_0$ "Java instructor" from the concept $210_0$ and the concept $210_3$. The concept $210_0$ represents the disambiguated word sense "professor/instructor: member of faculty at a college or university" and the concept $210_3$ represents the disambiguated word sense "Java: multi-platform, object-oriented programming language". In alternate embodiments, the topic generator 340 may composite any number of concepts 210 (including one) to form any number of the relevant topics 345.

As part of adding the relevant topic $345_0$ to the semantic network 110, the topic generator 340 generates a run-time cluster $430_0$ to represent the un-ordered set of the concepts 210 that are related to one or more of the concepts 210 included in the relevant topic $345_0$. As shown, the run-time cluster $430_0$ includes the concept $210_1$ ("university, college: educational institution for advanced learning") that is related to the concept t $210_0$ ("professor/instructor: member of faculty at a college or university"). The run-time cluster $430_0$ also includes any number of additional concepts 210 that are related to the concept $210_0$ "professor/instructor: member of faculty at a college or university) and/or the concept $210_3$ ("Java: multi-platform, object-oriented programming language.").

Each member of the run-time cluster 430 includes a run-time weight 420 that reflects the relative strength of the connection of the concept 210 to the relevant topic 345. The topic generator 340 may calculate the run-time weights 420 in any technically feasible fashion that is consistent with the composition of the relevant topic 345 that is associated with the run-time cluster 230. Notably, the topic generator 340 calculates the run-time weights 420 based on the weights 220 of the concepts 210 in the clusters 230.

The run-time weight $420_1$ (shown as 0.90) of the semantic connection between the relevant topic $345_0$ ("Java instructor") and the concept $210_1$ ("university, college: educational institution for advanced learning") reflects the weight $220_1$ (shown in FIG. 2 as 0.53) of the semantic connection between the concept $210_0$ and the concept $210_1$. Notably, the run-time weight $420_1$ also reflects the weight $420_N$ (not shown in either FIG. 2 or FIG. 4) of the semantic connection between the concept $210_3$ ("Java: multi-platform, object-oriented programming language) and the concept $210_1$.

In alternate embodiments, the topic generator 340 does not generate run-time clusters 430 that represent the un-ordered set of the concepts 210 that are related to one or more of the concepts 210 included in the relevant topic 345. Instead, for each of the relevant topics 345, the topic generator 340 orders the un-ordered set of the concepts 210 that are related to the relevant topics 345. Subsequently, the topic generator 340 performs matching topic operations between the relevant topics 345 that yield a relative strength of the connection between the relevant topics 345. Although, simply matching the concepts 210 included in the relevant topics 345 yields some sense of the relatedness of the relevant topics 345, more extensive matching operations provide more insightful estimates of the relatedness of the relevant topics 345. Accordingly, the topic generator 340 employs a topic matching process that considers, without limitation:

The syntactic structure of the relevant topic 345 (i.e., identifying the concept 210 included in the concepts 210 that is the head noun, identifying the concept 210 that is the middle noun, etc.).

The syntactic type of each of the concepts 210 (i.e. whether the concept 210 is derived from an adjective or a noun).

For each of the relevant topics 345, the position of each of the concepts 210 in the relevant topic 345 in relation to the total number of the concepts 210 included in relevant topic 345.

The semantic type of each of the concepts 210 (e.g., instance, common concept, etc.).

The relative sizes and number of differences between each of the relevant topics 345.

For example, in some alternate embodiments, the topic generator 340 implements the following topic matching process between the relevant topic $345_N$ and the relevant topic relevant topic $345_M$:

For every level X from 0 to S (size of the biggest relevant topic 345):

For each of the relevant topic $345_N$ and the relevant topic $345_M$, generate all subtopics of size X (retaining the order)

Match each subtopic of the relevant topic $345_N$ with the subtopics included in relevant topic $345_M$ to determine the maximum match.

Average the maximum matches for the subtopics of the relevant topic $345_N$.

Match each subtopic of the relevant topic $345_M$ with the subtopics included in the relevant topic $345_N$ to determine the maximum match.

Average the maximum matches for the subtopics of the relevant topic $345_M$.

Compute an average of the averaged maximum matches of all levels, taking into account that each level has a different importance based on the ratio of the level to the relative sizes of the relevant topic $345_N$ and the relevant topic $345_M$.

Advantageously, creating the relevant topics 345 at run-time to reflect the text segment 305 enables expansion of the semantic network 110 in a potentially limitless manner. Further, the recursive nature of creating the relevant topics 345 based on the relevant concepts 335 enables a hierarchical interpretation of the text segment 305 that is more likely to accurately capture the meaning of the text segment 305 than a more constrained, single level of comprehension approach.

Figure 5:
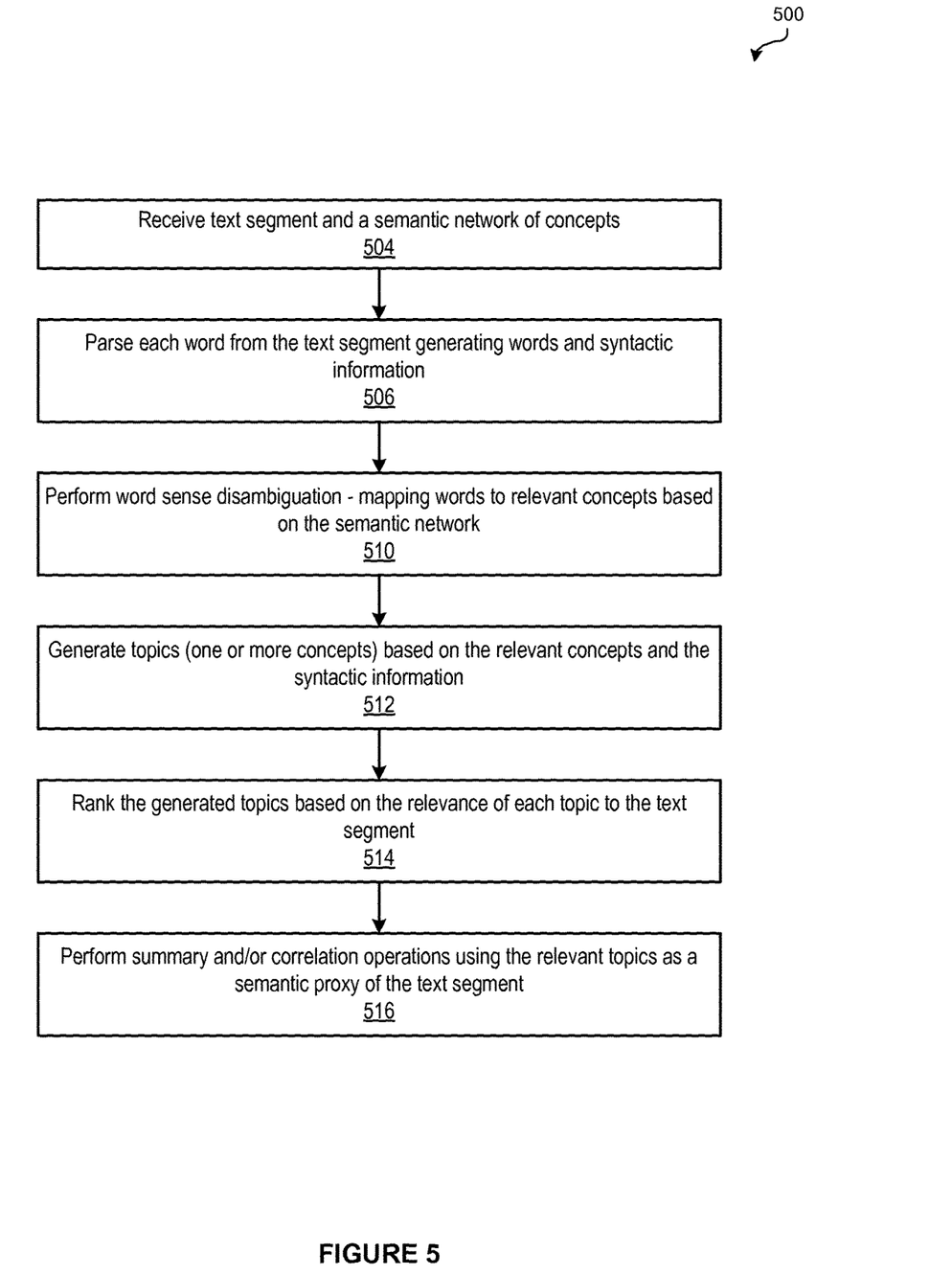
FIG. 5 is a flow diagram of method steps for interpreting a segment of text based on word sense, according to one embodiment of the present invention.

FIG. 5 is a flow diagram of method steps for interpreting a segment of text based on word sense, according to one embodiment of the present invention. Although the method steps are described with reference to the systems of FIGS. 1-4, persons skilled in the art will understand that any system configured to implement the method steps, in any order, falls within the scope of the present invention.

As shown, a method 500 begins at step 504, where the semantic extractor 130 receives the semantic network 110 and the text segment 305. As detailed previously herein, the semantic network 110 includes any number of the concepts 210. Advantageously, the concepts 210 distinguish between homographs (i.e., words that have the same spelling, but different meanings).

At step 506, the text preparation unit 310 parses the text segment 305 to obtain the text words 315 that are included in the text segment 305 and the syntactic data 325, such as position of the text words 315 within the text segment 305. The text preparation unit 310 may implement any parsing technique as known in the art and may output the syntactic data 325 in any technically feasible form.

At step 510, the word sense disambiguation engine (WSD) 330 processes the text words 315 in conjunction with the semantic network 110. More specifically, the WSD engine 330 maps each of the text words 315 to the most closely related concept 210 in the semantic network 110, generating an unordered list—the relevant concepts 335. In general, the WSD engine 330 selects the most closely related concept 210 based on the weights 220 that indicate the relative strengths of the semantic connectivity between the concept 210 and the other concepts 210 that included in the text words (i.e., the text segment 305).

At step 512, the topic generator 340 dynamically constructs the relevant topics 345 based on the relevant concepts 335 and the syntactic data 325. Each of the relevant topics 345 may be one of the relevant concepts 335 or a fusion of two or more of the relevant concepts 335. As part of step 510, the topic generator 340 calculates run-time weights 420 between pairs of the relevant topics 345 based on the weights 320 between the constituent concepts 210.

At step 514, the topic analyzer 350 evaluates each of the relevant topics 345 based on the run-time weights 420, and ranks the relevant topics 345 that are most related to the text segment 305. The resulting ranked list of topics 140 represents a structured translation of the text segment 305. At step 516, the summary tool 160 and/or the comparison tool 150 operate on the ranked list of topics 140. In general the summary tool 160 summarizes the text segment 305. The comparison tool 150 performs correlation operations between the ranked list of topics 140 and a ranked list of topics representing a different text segment. Subsequently, any number of applications may leverage the ranked list of topics 140, the summary of the ranked list of topics 140, or the comparison data that indicates the similarity between the ranked list of topics 140 and another topic.

In sum, the disclosed techniques may be used to efficiently and perceptively interpret text segments in computer-based implementations where word-meaning is important. Notably, a semantic extractor leverages a semantic network that differentiates between homographs (i.e., words that have the same spelling, but different meanings) to translate text segments into lists of relevant topics ranked by relevance. The semantic network includes concepts that represent word-meaning combinations as well as relevance ratings between concepts. In operation, a text preparation unit parses a text segment to generate text words and syntactic data. A word sense disambiguation engine then maps the text words to relevant concepts based on the semantic network. Subsequently, a topic generator analyzes and coalesces the relevant concepts in conjunction with the syntactic data to generate on-the-fly topics that each represents one or more relevant concepts. A topic analyzer then ranks the topics based on the relevance ratings of the constituent concepts. This relevance-ranked list of topics represents the meaning of the text segment.

Advantageously, the text interpretation techniques disclosed herein enable computer-based "understanding" of free-form text segments that mimics hierarchical human processing starting with word sense disambiguation. Because the semantic extractor produces a ranked list of relevant topics that provide structured meaning for text segments, the semantic extractor enables automated processes (e.g., text summarization, document searches, etc.) to operate based on word senses (concepts) and/or phrase senses (topics). By contrast, conventional text interpretation techniques typically operate on words with ambiguous meanings or unreliable, statistically-identified meanings. In the latter, statistical approach, guessed meanings are attained for words only, and not for phrases (compound concepts). In such conventional techniques, because the true meaning of each word in the text segment is not identified, the text segment is often misinterpreted. Further, because the semantic extractor replaces the language-specific representation of words with concepts, the relevance-ranked list of topics provide a language-neutral proxy for the meaning of text segments, facilitating correlation between text segments in disparate languages.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for interpreting text segments based on word sense, the method comprising:
   parsing a text segment to generate one or more text-based words and related syntactic information;
   mapping, via a processor, each of the one or more text-based words to at least one concept included in a database and based on a semantic network that includes the at least one concept and one or more relevance ratings associated with the at least one concept, wherein each concept included in the semantic network is associated with a meaning and at least one word;
   generating a plurality of topics based on the mappings and the syntactic information, wherein each topic includes one or more of the concepts included in the semantic network;
   for each topic included in the plurality of topics, calculating a topic relevance rating between the topic and at least another topic included in the plurality of topics based on the relevance ratings between the one or more concepts included in the topic and one or more concepts included in the another topic;
   ranking the plurality of topics based on the topic relevance ratings to generate a ranked topic list; and
   outputting an element for display based on the ranked topic list.

2. The computer-implemented method of claim 1, wherein the semantic network includes a first concept and a second concept, the first concept is associated with a first word that is defined in a dictionary, and the second concept is associated with a second word that is a proper noun and is not defined in the dictionary.

3. The computer-implemented method of claim 1, wherein mapping each of the one or more text-based words comprises performing one or more word sense disambiguation operations.

4. The computer-implemented method of claim 3, wherein the one or more word sense disambiguation operations for a first text-based word included in the one or more text-based words comprises:
   compositing a first meaning score for the first text-based word based on a first concept included in the at least one concept;
   compositing a second meaning score for the first text-based word based on a second concept included in the at least one concept;
   performing a comparison operation between the first meaning score and the second meaning score; and
   if the first meaning score is higher than the second meaning score, then mapping the first text-based word to the first concept, or
   if the first meaning score is not higher than the second meaning score, then mapping the first text-based word to the first concept.

5. The computer-implemented method of claim 4, wherein compositing the first meaning score comprises:
   calculating a geometric mean score, a word-to-word score, and a sense-to-sense score; and performing a weighted summation operation on the geometric score, the word-to-word score, and the sense-to-sense score.

6. The computer-implemented method of claim 1, wherein the plurality of topics include a first topic and a second topic, the first topic include a first concept, the second topic includes a second concept, and calculating the topic relevance rating comprises computing a function that is based on at least one of matches between the first concept and the second concept, the position of the concept 1 in the topic 1, and the position of the concept 2 in the topic 2.

7. The computer-implemented method of claim 1, further comprising determining that a first topic relevance rating for a first topic included in the plurality of topics is less than a predetermined threshold, and, in response removing the first topic from the plurality of topics prior to ranking the plurality of topics.

8. The computer-implemented method of claim 1, further comprising performing one or more comparison operations between the plurality of topics and another plurality of topics that is associated with a search term to establish a relevance between the search term and the text segment.

9. The computer-implemented method of claim 1, further comprising performing one or more syntactic mapping operations between the plurality of topics and the text segment based on the syntactic information to synthesize a textural summary of the text segment.

10. A non-transitory computer-readable storage medium including instructions that, when executed by a processing unit, cause the processing unit to interpret text segments based on word sense by performing the steps of:
    parsing a text segment to generate one or more text-based words and related syntactic information;
    mapping, via a processor, each of the one or more text-based words to at least one concept included in a database and based on a semantic network that includes the at least one concept and one or more relevance ratings associated with the at least one concept, wherein each concept included in the semantic network is associated with a meaning and at least one word;
    generating a plurality of topics based on the mappings and the syntactic information, wherein each topic includes one or more of the concepts included in the semantic network;
    for each topic included in the plurality of topics, calculating a topic relevance rating between the topic and at least another topic included in the plurality of topics based on the relevance ratings between the one or more concepts included in the topic and one or more concepts included in the another topic;
    ranking the plurality of topics based on the topic relevance ratings to generate a ranked topic list; and
    outputting an element for display based on the ranked topic list.

11. The non-transitory computer-readable storage medium of claim 10, wherein the semantic network includes a first concept and a second concept, the first concept is associated with a first word that is defined in a dictionary, and the second concept is associated with a second word that is a proper noun and is not defined in the dictionary.

12. The non-transitory computer-readable storage medium of claim 10, wherein the semantic network includes a first concept, the first concept is associated with a first phrase, and the first phrase includes a first word and a second word.

13. The non-transitory computer-readable storage medium of claim 10, wherein mapping each of the one or more text-based words comprises performing one or more word sense disambiguation operations.

14. The non-transitory computer-readable storage medium of claim 13, wherein the one or more word sense disambiguation operations for a first text-based word included in the one or more text-based words comprises:
    compositing a first meaning score for the first text-based word based on a first concept included in the at least one concept;
    compositing a second meaning score for the first text-based word based on a second concept included in the at least one concept;
    performing a comparison operation between the first meaning score and the second meaning score; and
    if the first meaning score is higher than the second meaning score, then mapping the first text-based word to the first concept, or
    if the first meaning score is not higher than the second meaning score, then mapping the first text-based word to the second concept.

15. The non-transitory computer-readable storage medium of claim 14, wherein compositing the first meaning score comprises:
    calculating a geometric mean score, a word-to-word score, and a sense-to-sense score; and
    performing a weighted summation operation on the geometric score, the word-to-word score, and the sense-to-sense score.

16. The non-transitory computer-readable storage medium of claim 10, wherein the semantic network includes a first concept and the first concept is associated with both a first word and a second word that is a synonym for the first word.

17. The non-transitory computer-readable storage medium of claim 10, wherein calculating the topic relevance rating between the topic and the another topic included in the plurality of topics comprises:
    ordering the concepts included in the topic and the another topic based on the related syntactic information; and
    performing one or more comparison operations between the one or more concepts included in the topic and the one or more concepts included in the another topic based on at least one of syntactic types of the one or more concepts, semantic types of the one or more concepts, positions of the one or more concepts, the size of the topic and the size of another topic, and the relative difference between the topic and the another topic.

18. The non-transitory computer-readable storage medium of claim 10, wherein calculating the topic relevance rating between the topic and the another topic included in the plurality of topics comprises performing one or more comparison operations between a subset of the one or more concepts included in the topic and a subset of the one or more concepts included in the another topic.

19. A system configured to interpret text segments based on word sense, the system comprising:
    a first memory that includes a semantic network, wherein the semantic network includes at least one concept included in a database and one or more relevance ratings associated with the at least one concept, and each concept included in the semantic network is associated with a meaning and at least one word; and
    a processing unit configured to:
        parse a text segment to generate one or more text-based words and related syntactic information;

map each of the one or more text-based words to the at least one concept included in the semantic network;

generate a plurality of topics based on the mappings and the syntactic information, wherein each topic includes one or more of the concepts included in the semantic network;

for each topic included in the plurality of topics, calculating a topic relevance rating between the topic and at least another topic included in the plurality of topics based on the relevance ratings between the one or more concepts included in the topic and one or more concepts included in the another topic;

ranking the plurality of topics based on the topic relevance ratings to generate a ranked topic list; and outputting an element for display based on the ranked topic list.

20. The system of claim 19, wherein the semantic network includes a first concept and a second concept, the first concept is associated with a first word that is defined in a dictionary, and the second concept is associated with a second word that is a proper noun and is not defined in the dictionary.

\* \* \* \* \*